US012320432B2

(12) United States Patent
Qu et al.

(10) Patent No.: US 12,320,432 B2
(45) Date of Patent: Jun. 3, 2025

(54) MULTI-PORT VALVE, AND THERMAL MANAGEMENT SYSTEM PROVIDED WITH SAME AND APPLICATION THEREOF

(71) Applicant: JOHNSON ELECTRIC INTERNATIONAL AG, Murten (CH)

(72) Inventors: Tao Qu, Shenzhen (CN); Yanping Ren, Shenzhen (CN); Ruifeng Qin, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 23 days.

(21) Appl. No.: 18/486,551

(22) Filed: Oct. 13, 2023

(65) Prior Publication Data

US 2024/0035581 A1    Feb. 1, 2024

Related U.S. Application Data

(63) Continuation of application No. PCT/CN2021/113676, filed on Aug. 20, 2021.

(30) Foreign Application Priority Data

Apr. 13, 2021   (CN) .......................... 202110394414.7
Jun. 29, 2021   (CN) .......................... 202121466003.6

(51) Int. Cl.
      *F16K 11/074*       (2006.01)
(52) U.S. Cl.
      CPC ................. *F16K 11/0743* (2013.01)
(58) Field of Classification Search
      CPC . F16K 11/0743; F16K 11/074; F16K 11/0746
      See application file for complete search history.

(56) References Cited

U.S. PATENT DOCUMENTS

| 1,717,012 A | 6/1929 | Dixon |
| 4,614,204 A * | 9/1986 | Dolejs ................ B01D 53/0446 |
| | | 137/625.46 |
| 2005/0034688 A1 | 2/2005 | Lelkes et al. |

FOREIGN PATENT DOCUMENTS

| CN | 1894527 A | 1/2007 |
| CN | 103851225 A | 6/2014 |

(Continued)

OTHER PUBLICATIONS

English Translation of International Search for Corresponding PCT Application No. PCT/CN2021/113676 Dec. 21, 2021.

*Primary Examiner* — Michael R Reid
(74) *Attorney, Agent, or Firm* — Aird & McBurney LP

(57) ABSTRACT

A multi-port valve includes a valve housing and a valve core. The valve housing is provided with a plurality of outer ports, at least part of which is arranged at an axial end of the valve housing. The valve core is provided with a plurality of inner ports, at least part of which is arranged at an axial end of the valve core. A plurality of flow channels extends through the valve core, whereas the flow channels are fluidly separated from one another inside the valve core. The plurality of the flow channels includes at least two cross-channels intersecting with each other in a projection plane perpendicular to a rotation axis of the valve core. Each of the flow channels communicates with two of the inner ports. At least part of the inner ports is aligned and communicated with the corresponding outer ports in response to the valve core rotating to a desired position as regarded to the valve housing.

16 Claims, 14 Drawing Sheets

(56) References Cited

FOREIGN PATENT DOCUMENTS

| CN | 106763902 A | 5/2017 |
| CN | 107178630 A | 9/2017 |
| CN | 111350840 A | 6/2020 |
| CN | 111350841 A | 6/2020 |
| EP | 3026307 A1 | 6/2016 |

* cited by examiner

MULTI-PORT VALVE, AND THERMAL MANAGEMENT SYSTEM PROVIDED WITH SAME AND APPLICATION THEREOF

CROSS REFERENCE TO RELATED APPLICATIONS

This non-provisional patent application is continuation application of PCT Application No. PCT/CN2021/113676, filed with the Chinese Patent Office on Aug. 20, 2021, which claims priority to Chinese Patent Applications No. 202110394414.7, filed on Apr. 13, 2021, and No. 202121466003.6, filed on Jun. 29, 2021, all of which are incorporated herein by reference in their entirety.

FIELD OF THE INVENTION

The invention relates to the technical field of valves, in particular to a multi-port valve and a thermal management system having the multi-port valve.

BACKGROUND

A valve is a controlling component in the fluid delivery system, which can be used to control the on-off, flow direction, etc. of the fluid. For example, in the thermal management system of new energy vehicles, valves are usually required to control flow of coolant. A common thermal management system of vehicle includes several cooling circuits (e.g., battery cooling circuits and electric drive system cooling circuits), and several heat exchangers (e.g., radiators and chillers). In real operation of the automotive thermal management system, it is always necessary to integrate multiple cooling circuits and multiple heat exchangers to achieve different work modes. An existing thermal management system of vehicle has several coolant valves to transfer coolant between multiple cooling circuits and/or multiple heat exchangers to achieve different work modes. Such a vehicle thermal management system has a complex structure and high cost.

SUMMARY OF THE INVENTION

The present invention aims to provide a multi-port valve that can solve the above-mentioned problems or at least alleviate the above-mentioned problems to a certain extent, and a thermal management system having the multi-port valve.

In one aspect, the present invention provides a multi-port valve including a valve housing and a valve core. The valve housing is provided with a plurality of outer ports, at least part of which is arranged at an axial end of the valve housing. The valve core is provided with a plurality of inner ports, at least part of which is arranged at an axial end of the valve core. A plurality of flow channels extends through the valve core, whereas the flow channels are fluidly separated from one another inside the valve core. The plurality of flow channels includes at least two cross-channels intersecting with each other in a projection plane perpendicular to a rotation axis of the valve core. Each of the flow channels communicates with two of the inner ports. At least part of the inner ports is aligned and communicated with the corresponding outer ports in response to the valve core rotating to a desired position as regarded to the valve housing. said at least two cross-channels extend to and communicate with the inner ports that are discharging at the same axial end of the valve core, and are offset from each other in a circumferential direction of the valve core.

Preferably, said at least two cross-channels are offset from each other in a circumferential direction of the valve core.

Preferably, each of said at least two cross-channels comprises at least one axial-extension segment communicating with the corresponding one of the inner ports at the axial end of the valve core and a transverse-extension segment extending perpendicularly to a rotation axis of valve core.

Preferably, the transverse-extension segments of said at least two cross-channels are displaced from each other in an axial direction of the valve core, and intersect with each other in the projection plane perpendicular to the rotation axis of the valve core.

Preferably, each of said at least two cross-channels comprises two axial-extension segments respectively extending from opposite ends of the corresponding transverse-extension segment thereof.

Preferably—the plurality of the flow channels further comprises a non-cross-channel comprising a transverse-extension segment and two axial-extension segments extending from opposite ends of the transverse-extension segment thereof, the transverse-extension segment of the non-cross-channel does not intersect with each of the transverse-extension of said at least two cross-channels in the projection plane perpendicular to the rotation axis of the valve core.

Preferably, the transverse-extension segments of the flow channels are all spaced apart from the periphery of the valve core.

Preferably, the valve core comprises a cylindrical base and a first end plate and a second end plate respectively fixed on opposite axial ends of the cylindrical base, two grooves are respectively provided in opposite axial ends of the base to respectively form the transverse-extension segments of the two cross-channels, and closed by the first end plate and the second end plate.

Preferably, the transverse-extension segment of one of the cross-channels and the transverse-extension segment of the non-cross-channel are respectively formed by separated grooves in the same end face of the cylindrical base.

Preferably, the first end plate defines a plurality of notches to form the inner ports of the valve core.

Preferably, one of the flow channels comprises a radial-extension segment extending from the transverse-extension segment thereof, one of the inner ports is defined in a circumferential wall of the valve core to be communicated with the radial-extension segment; one of the outer ports is defined in a circumferential wall of the valve housing to be aligned and communicated with the inner port in the circumferential wall of the valve core in response to a desired rotation position of the valve core.

Preferably, the multi-port valve further comprises a sealing member sandwiched between the axial ends of the valve housing and valve core respectively provided with the outer ports and the inner ports.

Preferably, the sealing member is made from rubber, the sealing member is fixed to the housing, and a polytetrafluoroethylene layer is coated on the side of the sealing member facing the valve core.

Preferably, the valve core is connected to a motor to drive the valve core to rotate in the valve housing.

In another aspect, the present invention provides a thermal management system including the multi-port valve above and a plurality of cooling fluid circuit correspondingly connecting with the outer ports of the valve housing, one or more of the cooling fluid circuits forms a closed cooling loop via the multi-port valve.

Preferably, the thermal management system is used to regulate temperature of cooling loops in a vehicle Preferably, central angles included by all the sub-ports are equal, a central angle included by each of the main ports is equal to a sum of the central angles included all the sub-ports in the same port group thereof.

DETAILED DESCRIPTION OF THE PREFERRED EMBODIMENTS

The present invention will be further described below based on the drawings and the embodiments.

Figure 1:
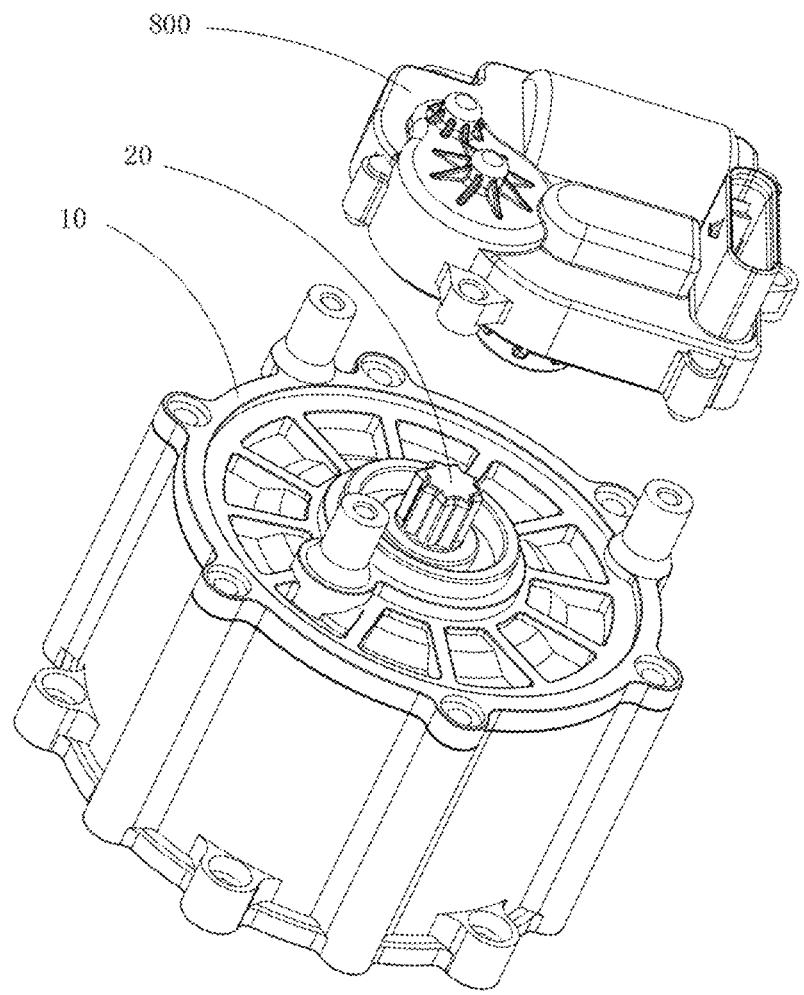
FIG. 1 is a perspective view of a multi-port valve according to a first embodiment of the present invention.
Figure 2:
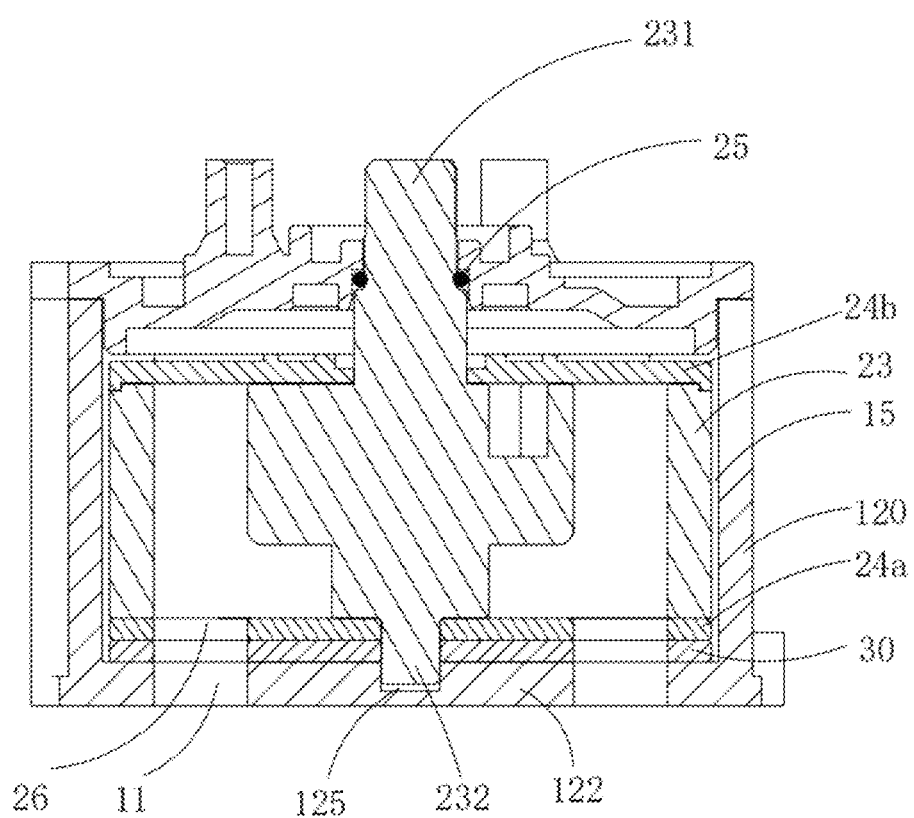
FIG. 2 is a cross-sectional view of the multi-port valve shown in FIG. 1.

Referring to FIGS. 1 to 2, the multi-port valve according to the first embodiment of the present invention includes a valve housing 10 and a valve core 20 rotatably accommodated in the valve housing 10. Both the valve housing 10 and the valve core 20 are substantially cylindrical. The valve housing 10 is provided with a plurality of outer ports 11. In this embodiment, the outer ports 11 are defined in an axial end of the valve housing 10 and distributed along a circumferential direction. The valve core 20 is provided with a plurality of inner ports 26. In this embodiment, the inner ports 26 are defined in an axial end of the valve core 20. The valve core 20 is rotatable relative to the valve housing 10 by a rotation axis so that at least part of the inner ports 26 and the corresponding outer ports 11 are axially aligned. the communicating inner ports of the multi-port valve in this embodiment can be rotated to communicate with different outer ports 11 in the axial direction. It can be understood that, in other embodiments, the inner port 26 may also be defined in other positions of the valve core, such as a circumferential wall thereof. Thus, the corresponding outer port may also be formed at other positions of the valve housing 10, such as a circumferential wall thereof, so that part of the inner ports communicates with the corresponding outer ports in an axial direction and other inner ports communicates with the corresponding outer ports in a radial direction.

Figure 3:
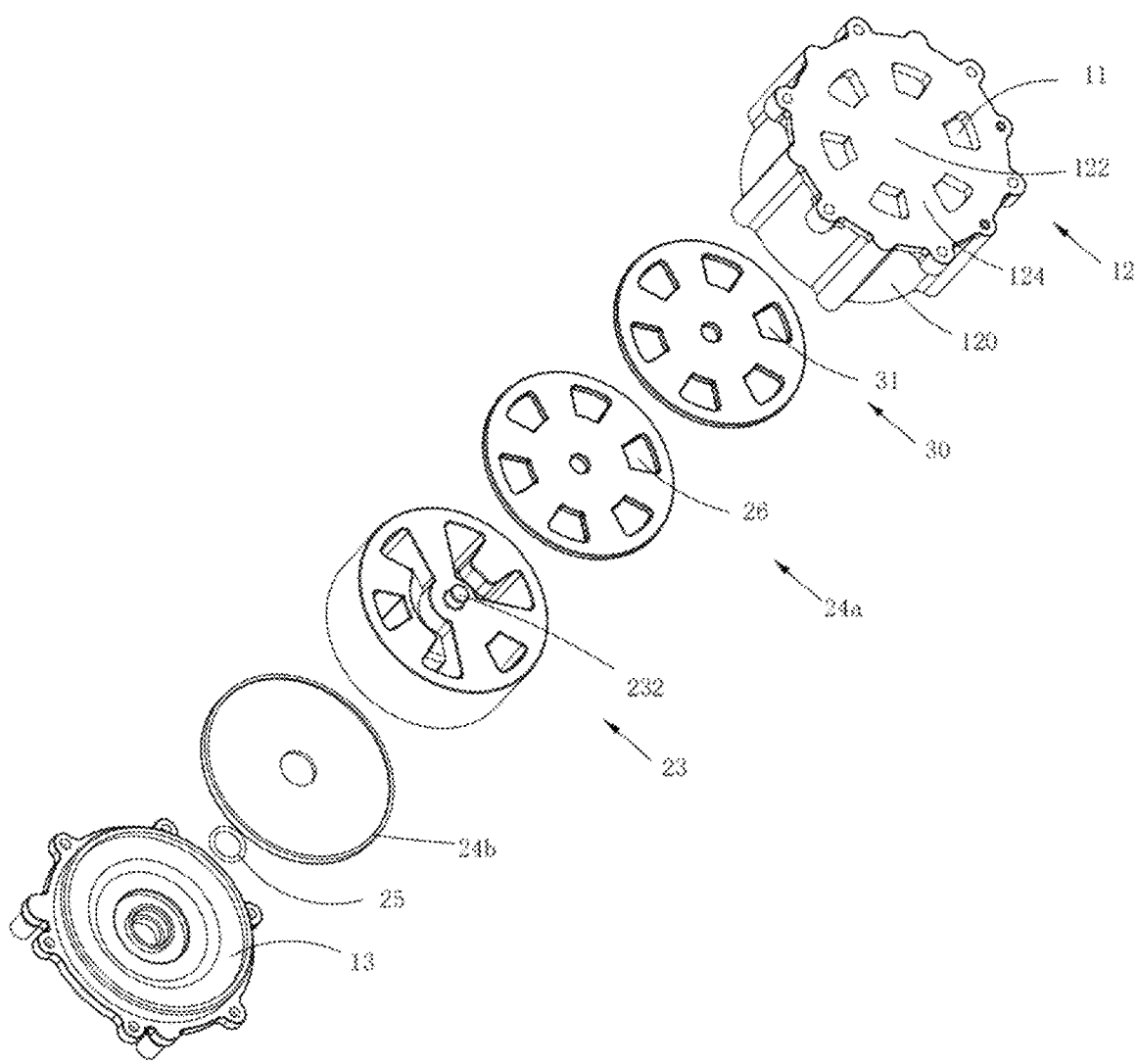
FIG. 3 is an exploded view of the multi-port valve shown in FIG. 1.
Figure 4:
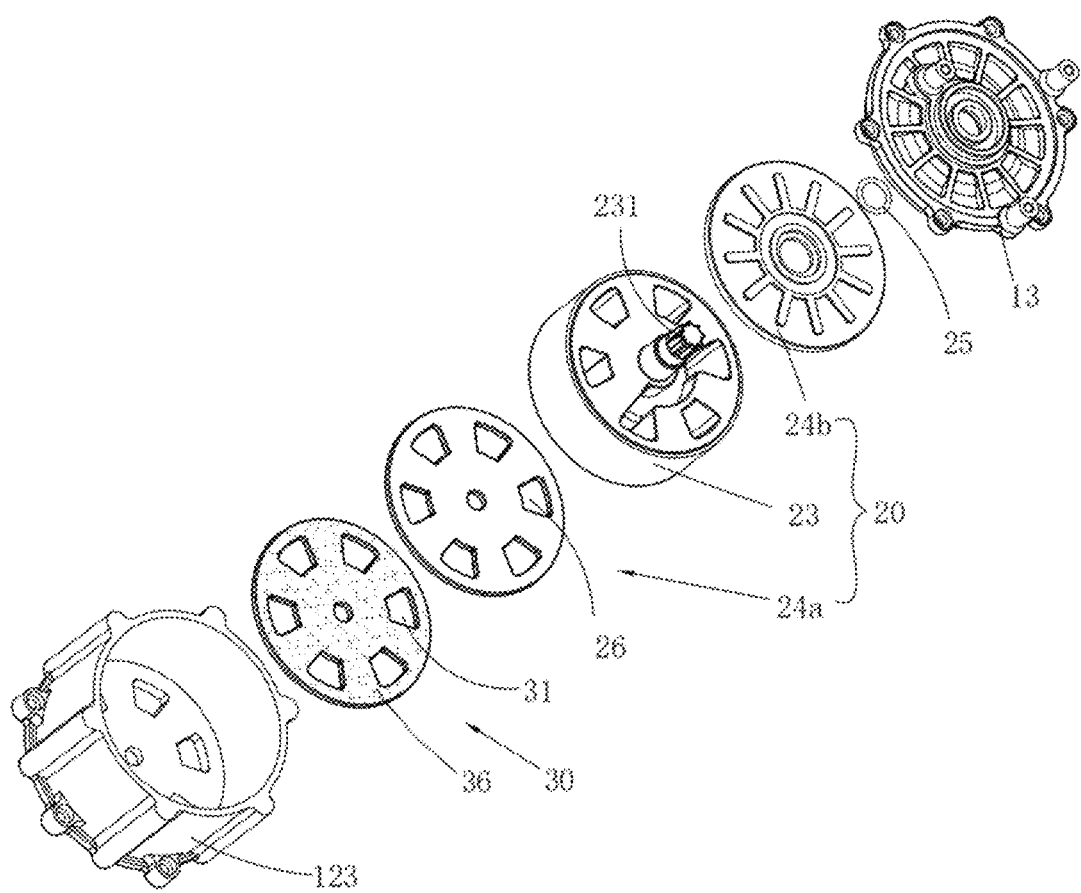
FIG. 4 is another exploded view of the multi-port valve shown in FIG. 1 shown in a different aspect.
Figure 5:
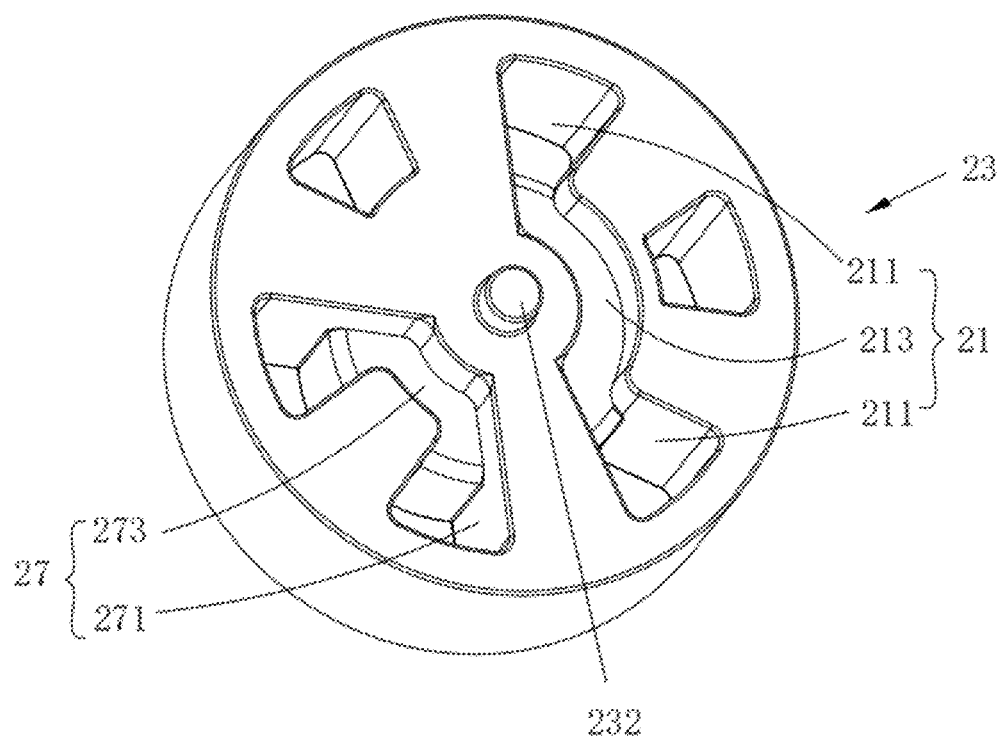
FIG. 5 is a perspective view of the cylindrical base of the valve core of the multi-port valve shown in FIG. 1.
Figure 6:
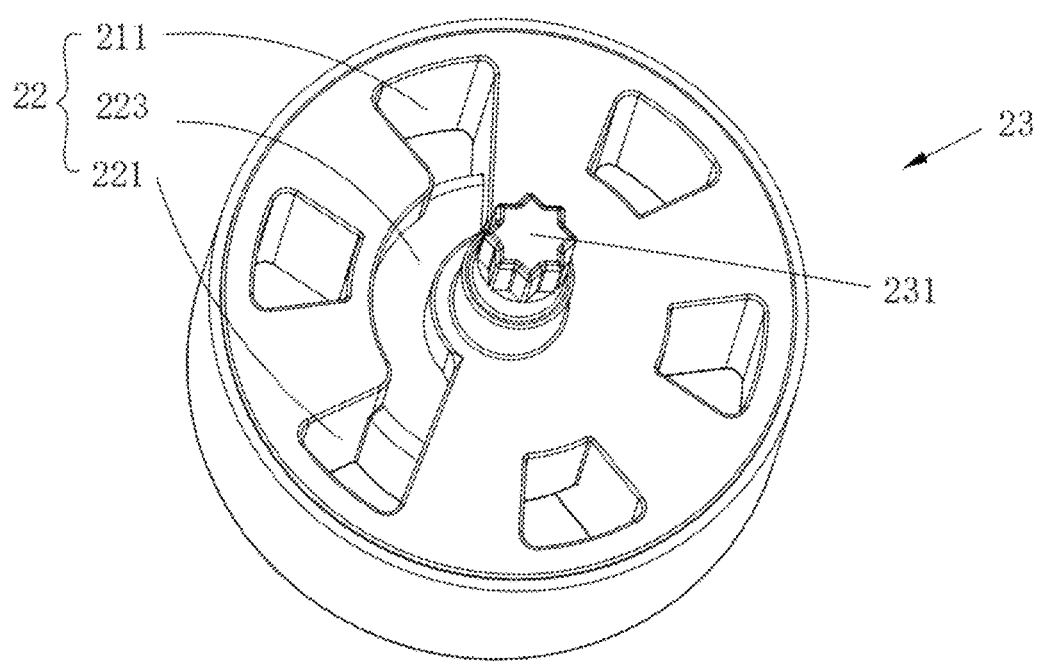
FIG. 6 is another perspective view of the cylindrical base of the valve core of the multi-port valve shown in FIG. 1 shown in a different aspect.

Referring to FIG. 3 and FIG. 4, in this embodiment, the valve housing 10 includes a cylindrical body 12 having one open axial end, and a circular housing cover 13 covering the open end of the cylindrical body 12. The housing cover 13 is fixed to the cylindrical body 12 with a plurality of screws to cooperatively bounding a receiving cavity 15 for receiving the valve core 20. In this embodiment, the cylindrical body 12 includes an annular circumferential wall 120 and an end wall located at one of axial ends of the circumferential wall 120. an end of the circumferential wall 120 away from the end wall are the open axial end. The end wall includes a central hub 122, a rim 123 adjoins the circumferential wall 120 of the cylindrical body 12, and a plurality of ribs 124 connecting the hub 122 and the rim 123, wherein the outer ports 11 are respectively formed between adjacent ribs 124. Preferably, the cylindrical body 12 is integrally formed.

Referring to FIGS. 3 to 6, in this embodiment, the valve core 20 is columnar with split structure, and includes a cylindrical base 23, and a first end plate 24a and a second end plate 24b respectively are sealingly mounted to opposite ends of the cylindrical base. In assembly, an assembly of the first end plate 24a, the second end plate 24b and the cylindrical base 23 are accommodated in the receiving cavity 15, with the second end plate 24b adjacent to the open end of the cylindrical body 12. In this embodiment, a drive shaft 231 extend away from the second end plate 24b along a rotation axis of the cylindrical base 23. The drive shaft 231 further extends axially through the housing cover 13 of the valve housing 10. Preferably, a sealing ring 25 is sandwiched between the drive shaft 231 and the housing cover 13. A driving source, such as a motor 800, drives the valve core 20 to rotate in the valve housing 10 via the driving shaft 231. In this embodiment, the motor 800 is further connected to the drive shaft 231 through a gear train. The central post 232 depends on a side of the first end plate 24a facing away from the second end plate 24b. A depression 125 is defined in the hub 122 of the cylindrical body 12, the central post 232 is rotatably received in the depression 125. The first end plate 24a is also provided with a plurality of notches to be used as the inner ports 26.

The valve core 20 with split structure is convenient to process. It can be understood that, in other embodiments, the valve core 20 may be made as an integrated structure.

Referring to FIGS. 5 to 10, m flow channels are defined in the cylindrical base 23 of the valve core 20, wherein m≥2. Each of the flow channels is configured to be connected to two of the inner ports. Each of the flow channels includes two axial-extension segments correspondingly communicating with the inner ports at the axial end surface of the valve core 20 and a transverse-extension segment communicating with the two axial-extension segments. The flow channels are fluidly separated from each other inside the valve core 20. Two of the cross-channels are intersected with each other in a projection plane perpendicular to a rotation axis of the valve core. The transverse-extension segments of said two of the flow channels are displaced from one another in the axial direction of the valve core. Therefore, configuration of the flow channels in the valve core provides a 3D staggered effect in space. This makes the multi-port valve more compact, smaller in size, lower in cost, and further improved in reliability.

Figure 7:
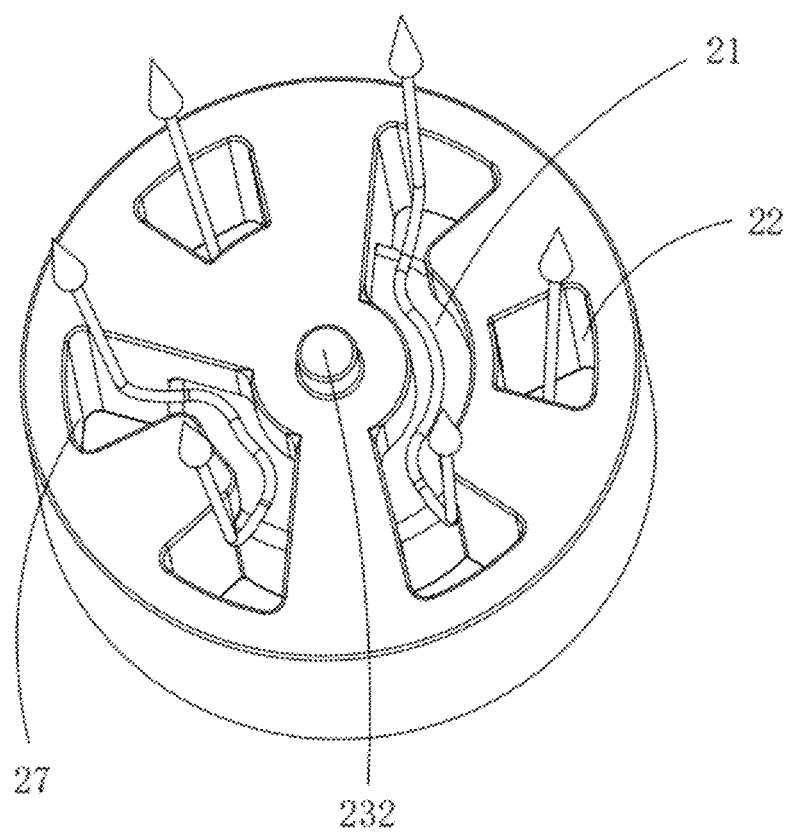
FIG. 7 is a schematic perspective view of the cylindrical base shown in FIG. 5 with marked lines with arrows to indicate fluid flow directions in the corresponding flow channels.
Figure 8:
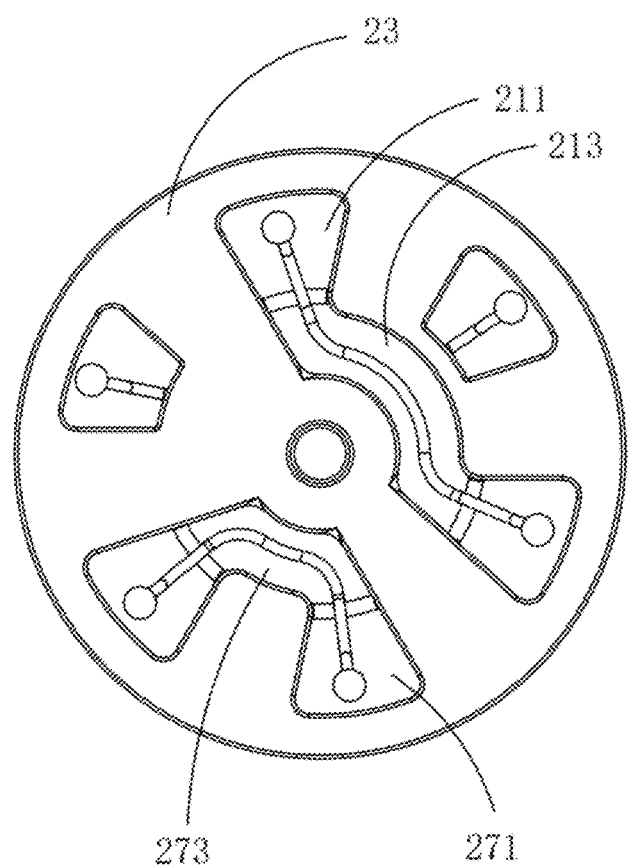
FIG. 8 is a top view of the cylindrical base shown in FIG. 7.
Figure 9:
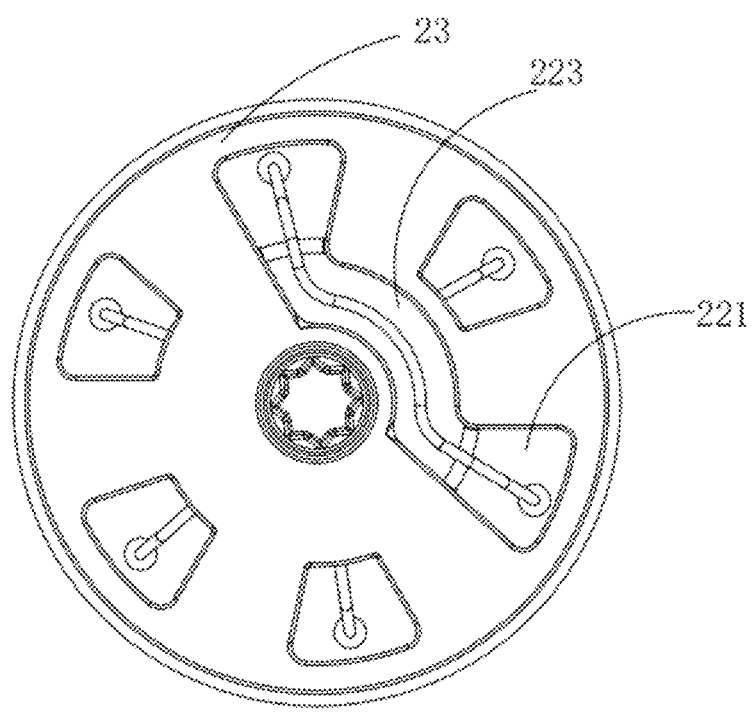
FIG. 9 is a bottom view of the cylindrical base shown in FIG. 7.
Figure 10:
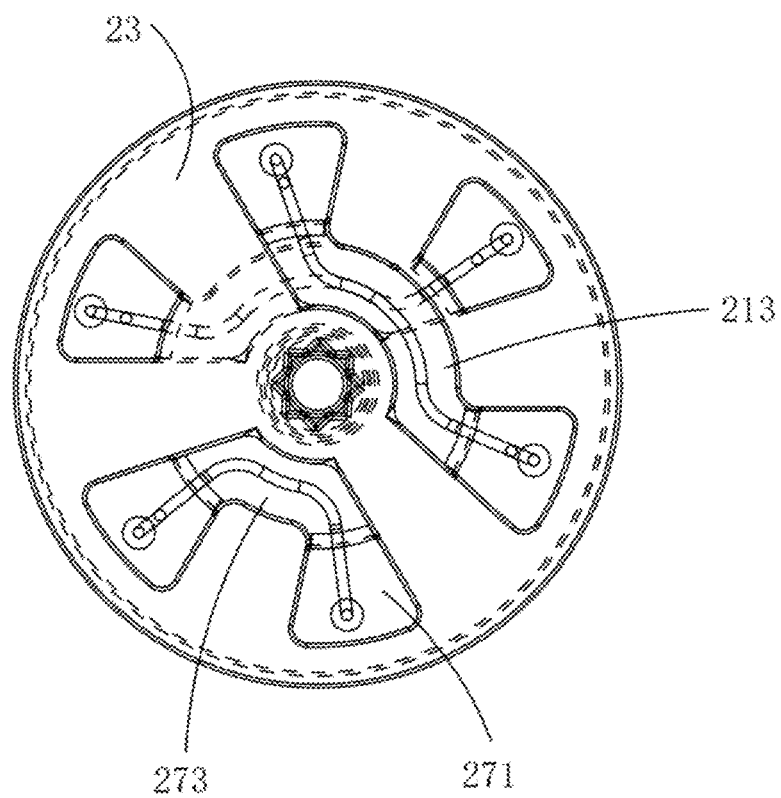
FIG. 10 is an axial perspective view of the cylindrical base shown in FIG. 7 with marked lines to indicate the fluid flow in the corresponding flow channels.
Figure 11:
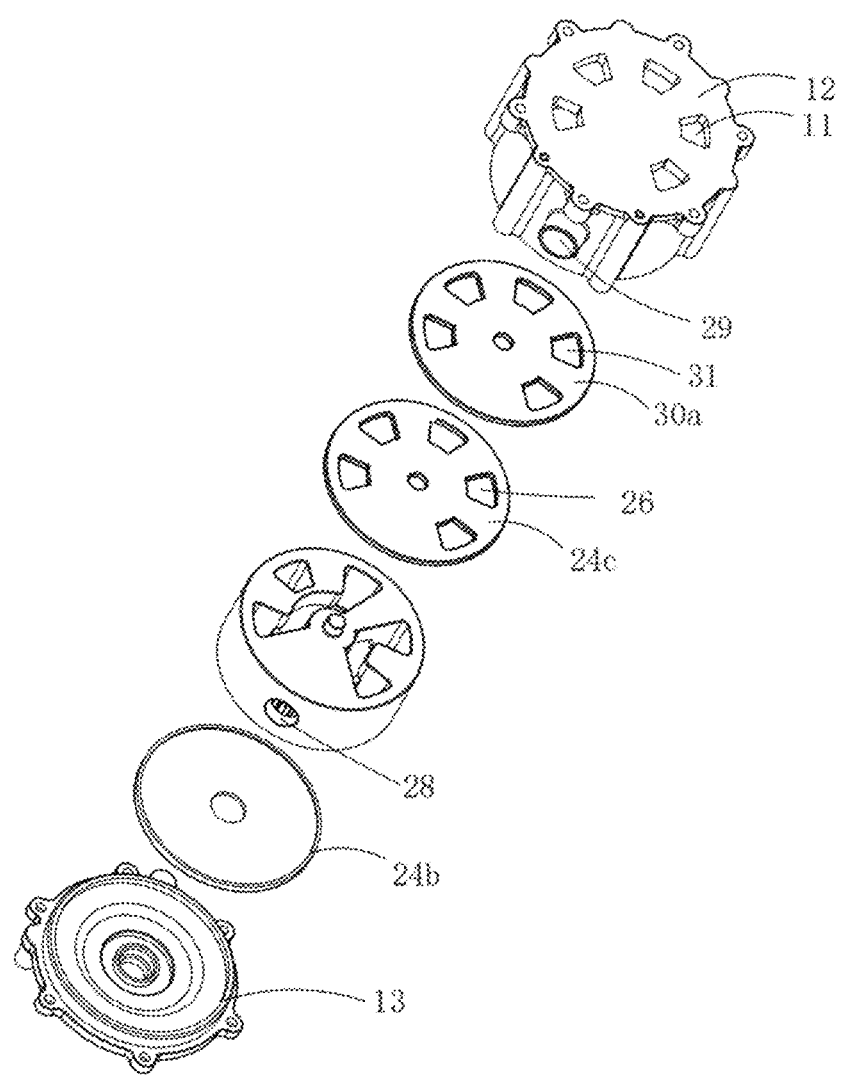
FIG. 11 is an exploded view of a multi-port valve according to a second embodiment of the present invention.
Figure 12:
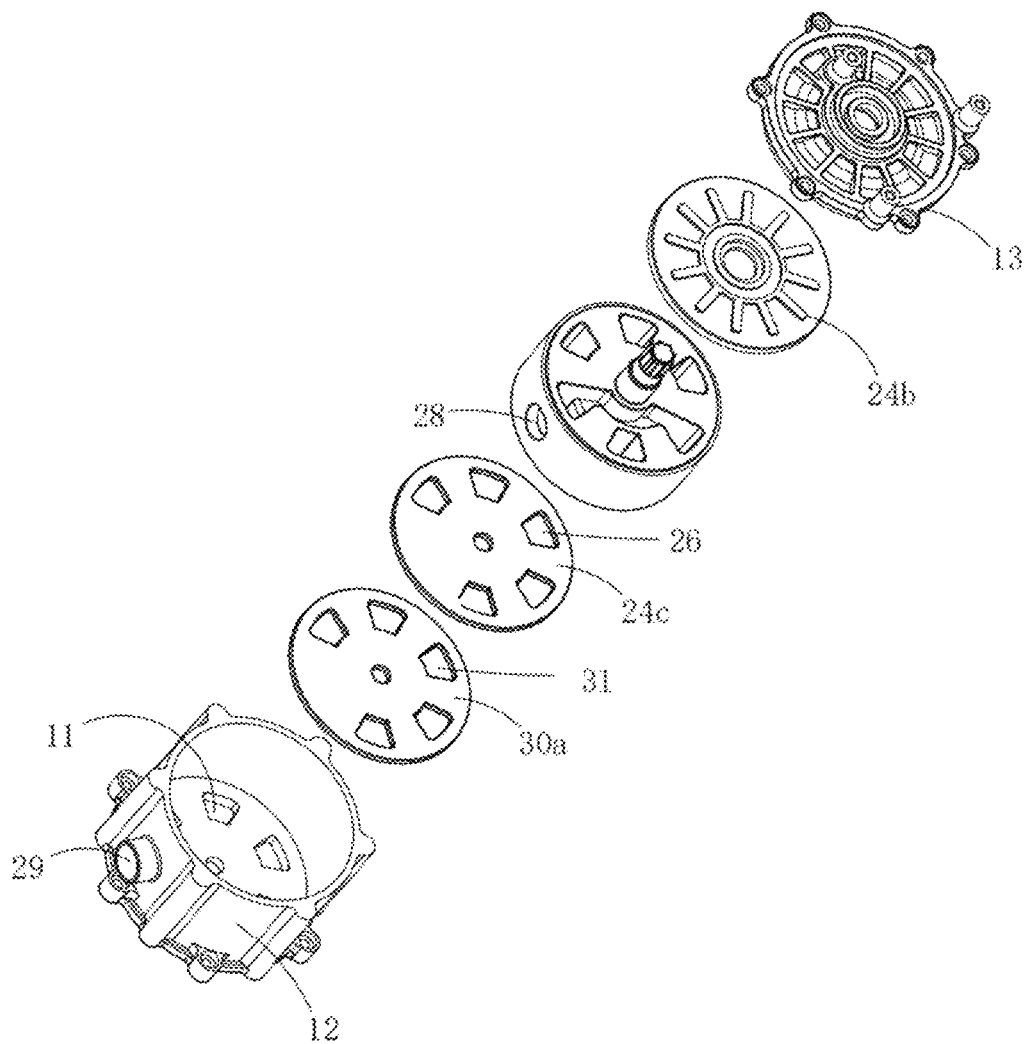
FIG. 12 is another exploded view of the multi-port valve shown in FIG. 11 shown in a different aspect.
Figure 13:
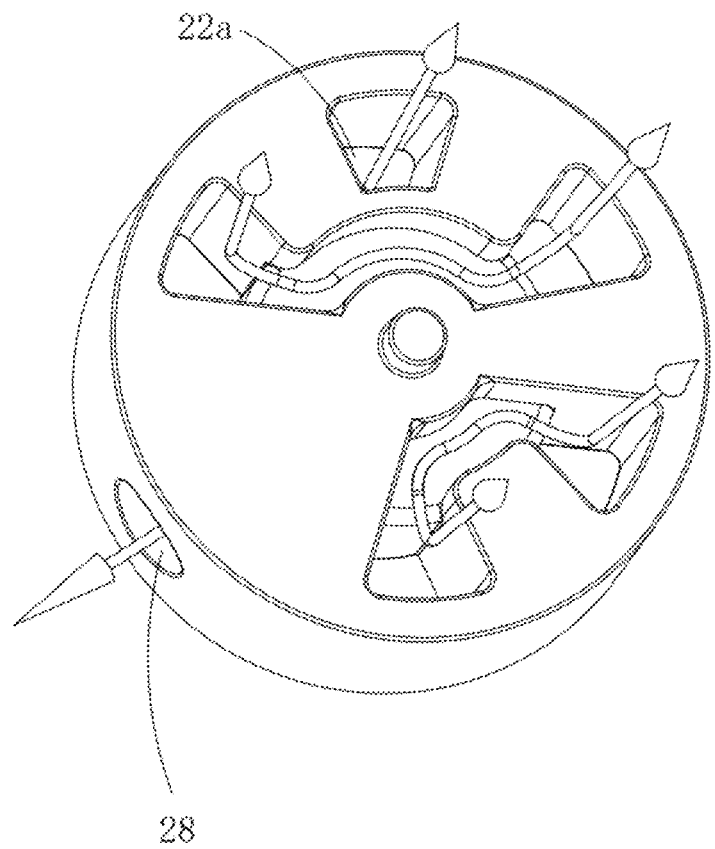
FIG. 13 is a schematic perspective view of the cylindrical base of the valve core of the multi-port valve shown in FIG. 11 with marked lines with arrows to indicate the fluid flow directions in the corresponding flow channels.
Figure 14:
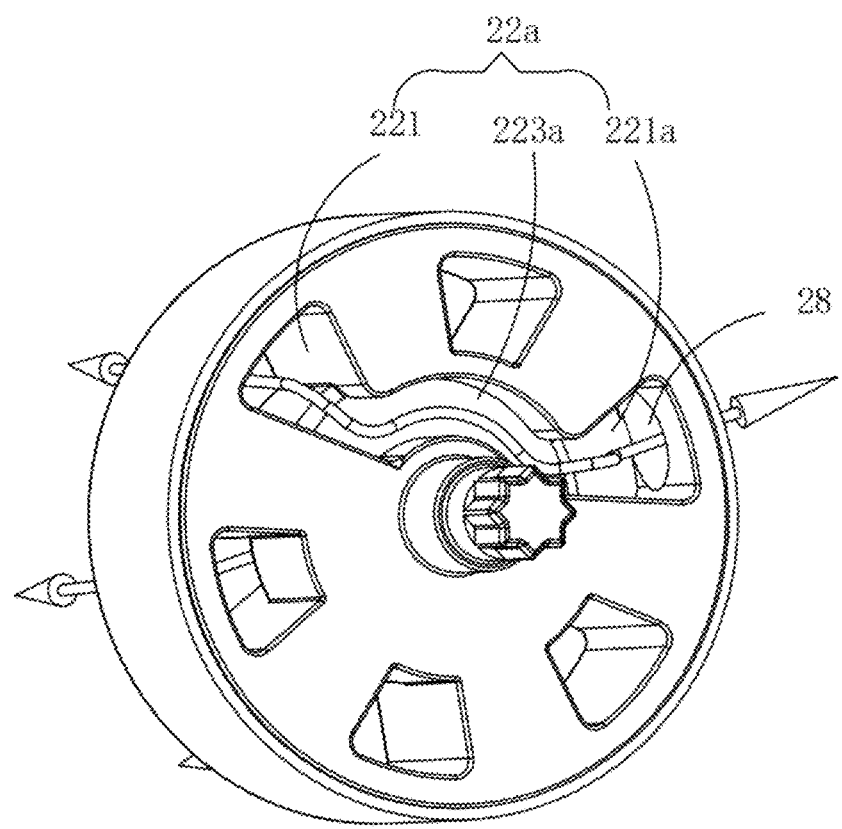
FIG. 14 is another schematic perspective view of the cylindrical base of the valve core of the multi-port valve shown in FIG. 11 after adding marked lines with arrows, wherein the marked lines with arrows indicate fluid flow direction in the corresponding flow channel.

Specifically, in this embodiment, the cylindrical base 23 is provided with a first flow channel 21 and a second flow channel 22, wherein the lines with arrows added in FIG. 7 indicate the fluid flow in the corresponding flow channels. The first flow channel 21 includes a first transverse-extension segment 213 and two first axial-extension segments 211 respectively connected to opposite ends of the first transverse-extension segment 213 and in fluid communication with the first transverse-extension segment 213. The second flow channel 22 includes a second transverse-extension segment 223 and two second axial-extension segments 221 respectively connected to opposite ends of the second transverse-extension segment 223 and in fluid communication with the second transverse-extension segment 223. Preferably, the first transverse-extension segment 213 and the second transverse-extension segment 223 extend laterally on the cylindrical base 23 of the valve core 20 and are displaced from one another in the axial direction of the valve core 20. More preferably, the first transverse-extension segment 213 and the second transverse-extension segment 223 are intersected with each other in a projection plane perpendicular to a rotation axis of the valve core 20.

Herein, an axial direction refers to a direction coincident with or parallel to the rotation axis of the drive shaft 231 of the multi-port valve. A circumferential direction refers to a rotation direction of the valve core 20. A radial direction refers to a direction perpendicular to and intersects with the drive shaft 231 of the multi-port valve. A lateral direction means a direction perpendicular to the drive shaft 231 of the multi-port valve and intersecting the radial direction.

In this embodiment, two grooves are respectively provided in opposite axial ends of the base to respectively form the first transverse-extension segment 213 and the second transverse-extension segment 223. In this embodiment, preferably, the first transverse-extension segment 213 and the second transverse-extension segment 223 respectively extend in an arc shape around the rotation axis of the cylindrical base 23. In assembly, the first end plate 24a and the second end plate 24b close the grooves at the ends of the cylindrical base 23. That is, to close the first transverse-extension segment 213 and the second transverse-extension segment 223 in the axial direction. The inner port 26 defined in the first end plate 24a is aligned and in communication with the first axial-extension segments 211 of the first flow channel 21 and the second axial-extension segments 221 of the second flow channel 22.

In this embodiment, the multi-port valve further includes a third flow channel 27, and the third flow channel 27 includes a third transverse-extension segment 273, and two third axial-extension segments 271 respectively connected to opposite ends of the third transverse-extension segment 273 and in fluid communication with the third transverse-extension segment 273. In this embodiment, the axial end of the cylindrical base 23 provided with the first transverse-extension segment 213 further defines a groove to form the third transverse-extension segment 273, which is also closed by the first end plate 24a. Therefore, the third transverse-extension segment 273 and the first transverse-extension segment 213 are separated from one another even in a projection plane perpendicular to the rotation axis of the valve core 20. Specifically, the third transverse-extension segment 273 extend in an arc shape and is located in a middle area the valve core away from a periphery of the valve core 20. The third axial-extension segment 271 extends in the axial direction of the cylindrical base 23 of the valve core 20 and communicates with the inner port 26 defined in the axial end of the valve core 20.

The first transverse-extension segment 213, the second extending section 221 and the third transverse-extension segment 273 are spaced apart from the periphery of the valve core 20. In this embodiment, the first transverse-extension segment 213 and the third transverse-extension segment 273 are located approximately at the same axial position of the cylindrical base 23 of the valve core 20. It can be understood that, in other embodiments, the first transverse-extension segment 213 and the third transverse-extension segment 213 are displaced from one another in the axial direction of the valve core 20.

Referring also to FIG. 3 and FIG. 4, in this embodiment, the multi-port valve further preferably includes a sealing member 30 axially sandwiched between the end wall of the cylindrical body 12 and the cylindrical base 23 of the valve core 20. Specifically, the sealing member 30 is provided with a plurality of notches 31 corresponding to the outer ports 11 in the end wall. Also preferably, the sealing member 30 is a rubber sheet, and a polytetrafluoroethylene layer 36 is coated on a side of the rubber sheet facing the valve core 20. In particular, the polytetrafluoroethylene layer 36, due to a lubricating effect, help to reduce the friction between the valve core 20 and the sealing member 30, improves the service life of the sealing member 30, and further improves the fluid sealing performance.

Referring to FIGS. 11 to 14, the multi-port valve of a second embodiment is similar to the multi-port valve of the previous embodiment, but with difference as that: the second flow channel 22a includes a second transverse-extension segment 223 a, a second axial-extension segment 221 and a radial-extension segment 221a respectively connected to opposite ends of the second transverse-extension segment 223a and in fluid communication with the second transverse-extension segment 223a. The second axial-extension segment 221 communicates with one of the inner ports 26 defined in the axial end of the valve core. The radial-extension segment 221a extends to and communicates with the inner port 28 defined in the circumferential wall of the cylindrical base 23 of the valve core 20. The circumferential wall 120 of the cylindrical body 12 is provided with an outer port 29 configured to be in communication with the inner port 28 when be rotated to a desired position. An axial end of the cylindrical base 23 defines a groove to form the third transverse-extension segment 273. Accordingly, a sealing member 30a of the second embodiment is different from that of the first embodiment corresponding to the first end plate 24c in the second embodiment.

Figure 15:
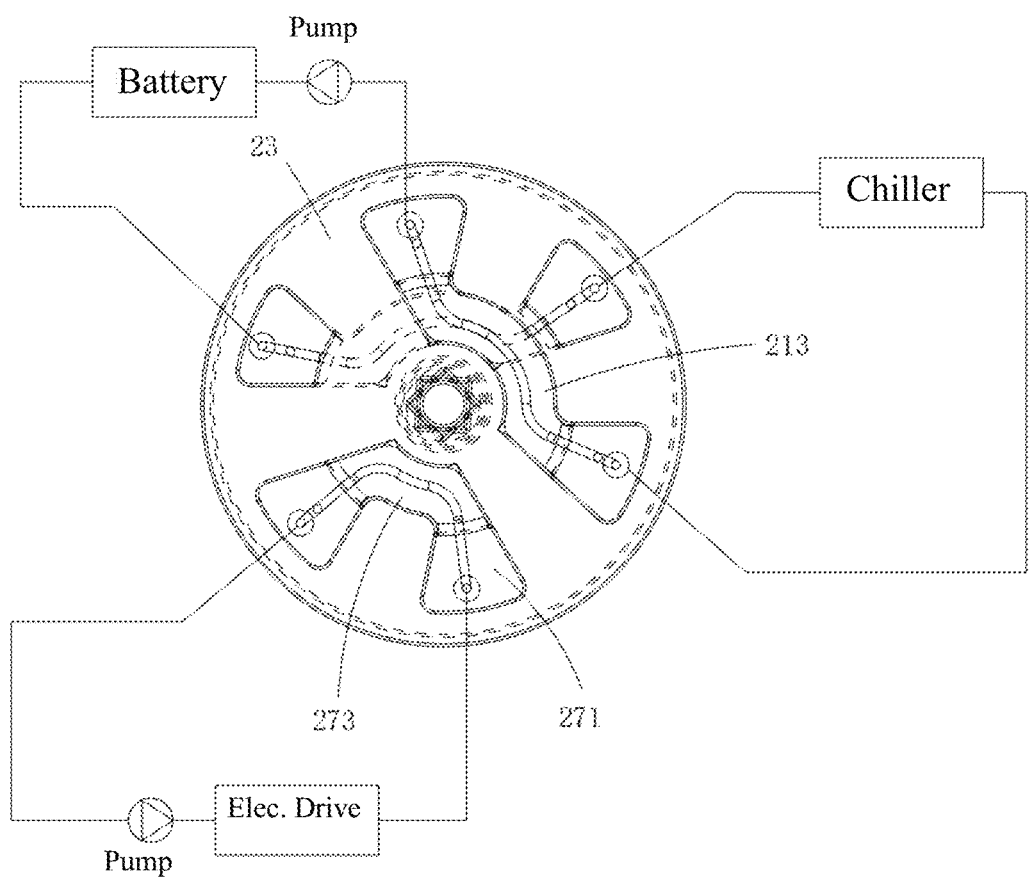
FIG. 15 is a schematic diagram of a thermal management system with the multi-port valve of the first embodiment of the present invention.

As shown in FIG. 15, the present disclosure also provides a thermal management system, which includes a plurality of cooling fluid circuits, such as a battery cooling circuit, an electric-driving system cooling circuit, and a chiller branch, as well as the multi-port valve of the first embodiment. The cooling fluid circuits of the thermal management system are connected to the outer ports of the valve housing 10, correspondingly. In use, the valve core 20 is rotated to make the inner ports of the valve core 20 to be in alignment and communication with the corresponding outer ports, so that one or more of the cooling fluid circuits form a closed cooling loop via the multi-port valve. The thermal management system may be used to regulate a temperature of cooling loops in a vehicle.

Although certain inventive embodiments of the present disclosure have been specifically described, the present disclosure is not to be construed as being limited thereto. Various changes or modifications may be made to the present disclosure without departing from the scope and spirit of the present disclosure.

The invention claimed is:

1. A multi-port valve comprising:
a valve housing and a valve core rotatably housed in the valve housing, both the valve housing and the valve core being substantially cylindrical; the valve housing be provided with a plurality of outer ports, at least part of which being arranged at an axial end of the valve housing; the valve core being provided with a plurality of inner ports, at least part of which being arranged at an axial end of the valve core; a plurality of flow channels extending through the valve core, whereas the flow channels are fluidly separated from one another inside the valve core, the plurality of the flow channels comprising at least two cross-channels intersecting with each other in a projection plane perpendicular to a rotation axis of the valve core; each of the flow channels communicating with two of the inner ports; at least part of the inner ports being aligned and communicated with the corresponding outer ports in response to the valve core rotating to a desired position as regarded to the valve housing; said at least two cross-channels extend to and communicate with the inner ports that are discharging at the same axial end of the valve core.

2. The multi-port valve according to claim 1, characterized in that said at least two cross-channels are offset from each other in a circumferential direction of the valve core.

3. The multi-port valve according to claim 1, characterized in that each of said at least two cross-channels comprises at least one axial-extension segment communicating with the corresponding one of the inner ports at the axial end of the valve core and a transverse-extension segment extending perpendicularly to a rotation axis of valve core.

4. The multi-port valve according to claim 3, characterized in that the transverse-extension segments of said at least two cross-channels are displaced from each other in an axial direction of the valve core, and intersect with each other in the projection plane perpendicularly to the rotation axis of the valve core.

5. The multi-port valve according to claim 4, characterized in that each of said at least two cross-channels comprises two axial-extension segments respectively extending from opposite ends of the corresponding transverse-extension segment thereof.

6. The multi-port valve according to claim 5, characterized in that the plurality of the flow channels further comprises a non-cross-channel comprising a transverse-extension segment and two axial-extension segments extending from opposite ends of the transverse-extension segment thereof, the transverse-extension segment of the non-cross-channel does not intersect with each of the transverse-extension of said at least two cross-channels in the projection plane perpendicularly to the rotation axis of the valve core.

7. The multi-port valve according to claim 6, characterized in that the transverse-extension segments of the flow channels are all spaced apart from the periphery of the valve core.

8. The multi-port valve according to claim 7, characterized in that the valve core comprises a cylindrical base and a first end plate and a second end plate respectively fixed on opposite axial ends of the cylindrical base, two grooves are respectively provided in opposite axial ends of the base to respectively form the transverse-extension segments of the two cross-channels, and closed by the first end plate and the second end plate.

9. The multi-port valve according to claim 8, characterized in that the transverse-extension segment of one of the cross-channels and the transverse-extension segment of the non-cross-channel are respectively formed by separated grooves in the same end face of the cylindrical base.

10. The multi-port valve according to claim 8, characterized in that the first end plate (24a) defines a plurality of notches to form the inner ports of the valve core.

11. The multi-port valve according to claim 3, characterized in that one of the flow channels comprises a radial-extension segment extending from the transverse-extension segment thereof, one of the inner ports is defined in a circumferential wall of the valve core to be communicated with the radial-extension segment; one of the outer ports is defined in a circumferential wall of the valve housing to be aligned and communicated with the inner port in the circumferential wall of the valve core in response to a desired rotation position of the valve core.

12. The multi-port valve according to claim 1, characterized in that the multi-port valve further comprises a sealing member sandwiched between the axial ends of the valve housing and valve core respectively provided with the outer ports and the inner ports.

13. The multi-port valve according to claim 12, characterized in that the sealing member is made from rubber, the sealing member is fixed to the housing, and a polytetrafluoroethylene layer is coated on the side of the sealing member facing the valve core.

14. The multi-port valve according to claim 1, characterized in that the valve core is connected to a motor (800) to drive the valve core to rotate in the valve housing.

15. A thermal management system, comprising the multi-port valve according to claim 1 and a plurality of cooling fluid circuits correspondingly connecting with the outer ports of the valve housing, one or more of the cooling fluid circuits forms a closed cooling loop via the multi-port valve.

16. The thermal management system according to claim 15, configured to be used to regulate temperature of cooling loops in a vehicle.

* * * * *